United States Patent [19]
Terasawa et al.

[11] 4,033,675
[45] July 5, 1977

[54] WIDE ANGLE LENS

[75] Inventors: Hidenori Terasawa; Ikuo Mori, both of Kawasaki, Japan

[73] Assignee: Nippon Kogaku K.K., Tokyo, Japan

[22] Filed: Apr. 23, 1976

[21] Appl. No.: 679,687

[30] Foreign Application Priority Data

May 2, 1975 Japan ............................... 50-52540

[52] U.S. Cl. .............................................. 350/216
[51] Int. Cl.² .......................................... G02B 9/60
[58] Field of Search ................... 350/214, 215, 216

[56] References Cited
UNITED STATES PATENTS
2,721,499  10/1955  Bertele ............................. 350/216

Primary Examiner—John K. Corbin
Assistant Examiner—Conrad Clark
Attorney, Agent, or Firm—Shapiro and Shapiro

[57] ABSTRACT

In a wide angle lens system, there are arranged, in succession from the object side toward the image side, a divergent first lens group having its surface of smaller curvature facing the object side, a divergent, meniscus, second lens group having its convex surface facing the object side, the first and second lens groups defining therebetween a divergent, meniscus-shaped air chamber having its convex surface facing the object side, a convergent, meniscus, third lens group consisting of a plurality of lenses, a convergent, meniscus, fourth lens group consisting of a plurality of lenses, and a divergent, meniscus, fifth lens group having its convex surface facing the image side.

10 Claims, 1 Drawing Figure

WIDE ANGLE LENS

BACKGROUND OF THE INVENTION

1. Field of the Invention:

This invention relates to a novel type of wide angle lens having excellent image forming performance suitable as a picture-taking lens for cameras of large size, say 4 inches × 5 inches or so.

2. Description of the Prior Art

In order to well correct distortion and curvature of image field throughout 100° or more, it is usually necessary to adopt a lens system of the type in which lenses are symmetrically disposed with a stop intervening therebetween. It is well known that such a symmetrical type of lens was realized by L. Bertele long ago.

However, the conventional lens system of this type has a problem in that the entire lens system is rendered bulky by the concave lenses occupying the opposite ends of the lens system. When swing and tilt photography is to be carried out with such a lens system mounted, for example, on a large camera, the great diameter of the last lens causes the lens to touch the bellows of the camera, or if not, causes the marginal light to be widely diverted, thus rendering swing and tilt photography impossible. Of course, such a disadvantage is not encountered by a camera which permits the back-focus (hereinafter referred to as B.f.) to be great like the retrofocus, but in the symmetrical type wherein a concave lens is disposed most adjacent to the image plane, the B.f. is necessarily short, so that the above-noted disadvantage is encountered.

As an ultra-wide angle lens for large cameras, it is therefore desirable to reduce the size of the lens system and also to minimize the effective aperture of the last lens in particular (the effective aperture on the last tangential plane).

On the other hand, when viewed in terms of the aberrations to be corrected, it is often the case that the lens is used at small aperture (because the influence of the granularity of the film is small as a result of the great dimensions of the picture plane), and for the purpose of providing a representation and depth of the minute structure of the object to be photographed; but it is still necessary to correct distortion, the curvature of image field, etc., as far as possible. It is also desirable that the relative aperture be as great as possible to facilitate focusing.

Generally, however, the smaller the lens system, the worse these aberrations become.

SUMMARY OF THE INVENTION

The present invention provides a wide angle lens which satisfies the above-noted requirements while well correcting the various aberrations.

According to the present invention, the wide angle lens system comprises, in succession from the object side toward the image side, a divergent first lens group having its surface of smaller curvature facing the object side, a divergent, meniscus, second lens group having its convex surface facing the object side, said first and second lens groups defining therebetween a divergent, meniscus-shaped air chamber having its convex surface facing the object side, a convergent, meniscus, third lens group consisting of a plurality of lenses, a convergent, meniscus, fourth lens group consisting of a plurality of lenses, a divergent meniscus, fifth lens group having its convex surface facing the image side.

The invention will become more fully apparent from the following detailed description thereof taken in conjunction with the accompanying drawing.

BRIEF DESCRIPTION OF THE DRAWING

The single FIGURE is a schematic view illustrating the construction according to an embodiment of the present invention.

DESCRIPTION OF THE PREFERRED EMBODIMENTS

Figure 1:
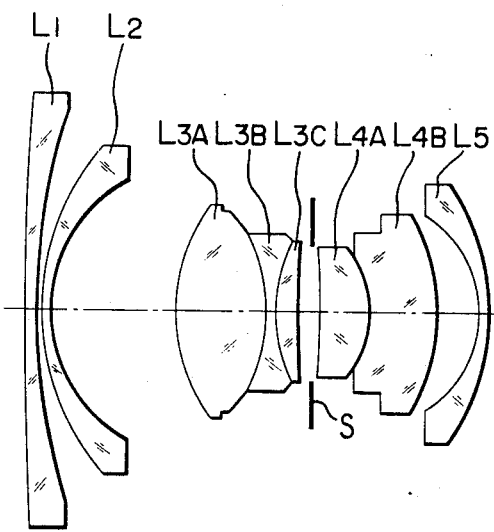

An embodiment of the present invention will hereinafter be described by reference to the single FIGURE. The embodiment comprises, in succession from the object side, a first lens group L1 having a negative power, a second lens group L2 having a negative power, a third lens group L3 consisting of three positive, negative and positive lenses L3A, L3B, and L3C cemented together to provide a positive composite power, a stop S, a fourth lens group consisting of two positive and negative lenses L4A and L4B to provide a positive composite power, and a fifth lens group L5 having a negative power, and which satisfies at least the following conditions:

$$d_{11} < d_4, \quad (I)$$
$$R_4 > R_3 \text{ and} \quad (II)$$
$$n_3 < n_4, \quad (III)$$

where R1, R2, . . . R13 are successive radii of curvature, $d_1$ to $d_{12}$ are center thicknesses and air spacings, and $n_1, n_2, \ldots n_8$ are the refractive indices of the glasses used.

Significances of these restrictive conditions will now be described.

The requirement of minimizing the effective aperture of the last lens group L5 has already been noted, and according to the present invention, such requirement is met by satisfying condition (I). This condition is not preferable when considered in terms of lens performance, and particularly greatly aggravates the various non-axial aberrations. However, such means must unavoidably be adopted to effectively carry out swing and tilt photography. Therefore, condition (I) is a requisite for the construction of the lens system to enable swing and tilt photography to be carried out, but this condition should desirably be in the range of $d_{11} < 0.5 d_4$ to provide a further advantage. If condition (I) is exceeded, swing and tilt photography using ordinary bellows will necessarily undergo "kick" or diversion, and thus there occurs a limitation. The aberration which will be most seriously affected by the addition of such condition (I) may be astigmatism, and particularly of the meridional plane. In addition, the non-axial, lateral aberration is so closely related to the aggravation of the meridional plane that good correction of the lateral aberration cannot be achieved without good correction of the meridional plane. Therefore, in order that such correction may be well achieved, condition (II) is imposed upon the first L1 and the second lens group L2 disposed adjacent to the object side so that the air chamber formed between the lens groups L1 and L2 may provide a divergent meniscus shape which is useful to correct the meridional plane. In the heretofore well-known symmetrical lens (for example, Japanese Pat. No. 4277/1955 by L. Bertele), the aforementioned air chamber provides a convergent meniscus shape, whereas in the lens system according to the present invention, the symmetry is substantially destroyed by condition (I), thus resulting in aggravation of the meridional plane even in the half angle of view exceeding 40°. This may more effectively be corrected by making said air chamber larger in its marginal space than in its axial space; that is, by making the air chamber into a divergent meniscus shape, and such design will particularly impart a very great effect to the meridional plane in the half angle of view exceeding 40°. However, in the vicinity of the half angle of view 20°, such effect is considerably reduced but, originally, the meridional plane in this vicinity is little affected even if the symmetry thereof is destroyed. When this condition is exceeded, the curvature of the meridional plane particularly in the half angle of view ranging from 40° to 50° is increased, and this cannot be corrected by any other surface.

Consideration will now be given to an increased relative aperture which is also one of the aims of the present invention. For correction of the spherical aberration resulting therefrom, the third lens group is formed by cementing together the biconvex lens L3A, the biconcave lens L3B and the biconvex lens L3C in succession from the object side, and condition (III) is imposed upon both the lenses L3A and L3B to provide a joint surface acting as a convergent one, which surface is used for the intended correction. If this condition is exceeded, a greater influence will be imparted to the spherical aberration and accordingly, a relatively great relative aperture cannot be expected and thus, F/8 or near will be the maximum obtainable. Further, this condition is also effective for the correction of distortion, but in order that negative distortion may be corrected to the utmost by the negative lenses of the first and second groups, the curvatures R3 and R4 of both surfaces of the second lens group L2 should desirably be in the range of 2R4 > R3 > R4. From the choice for the correction of various aberrations or from the requirements of manufacture, the fourth lens group L4 may comprise three lenses joined together or divided, as required.

Finally, correction of axial and non-axial chromatic aberrations may relatively easily be accomplished by imposing the following limitations upon each of the third group L3 and the fourth group L4:

$\nu d_3 > \nu d_4 < \nu d_5$ and $\nu d_6 > \nu d_7$, where $\nu d$ represents the dispersive power in the $d$-line of the glass used in each lens.

According to the present invention, by imposing the conditions (I), (II), and (III) as described above, it is possible to provide a lens system with a wide angle and a great relative aperture while strongly reducing the various aberrations.

More specifically, the present invention can provide a wide angle lens in which the distance ($\Sigma d$) from the vertex of the object-side surface of the first lens group to the vertex of the image-side surface of the fifth lens group is smaller than the focal length, and in which the aperture of the smallest filter provided in front of the first lens group is $0.9f - 1.1f$, the effective aperture of the fifth lens group is very small, say, of the order of $0.5f$ and the maximum relative aperture is F/4.

Numerical data in various examples will be shown below.

Seidel Coefficients in Example I

-continued

| | I | II | III | IV | V |
|---|---|---|---|---|---|
| R1 | 0.000 | 0.003 | 0.107 | 0.061 | 0.525 |
| R2 | −0.769 | −0.328 | −0.729 | −0.450 | −0.192 |
| R3 | 6.028 | 0.232 | 0.912 | 0.894 | 0.034 |
| R4 | −35.459 | 3.692 | −2.532 | −1.763 | 0.184 |
| R5 | 52.997 | 1.764 | 1.478 | 1.361 | 0.045 |
| R6 | 8.707 | −1.800 | 1.212 | 0.467 | −0.097 |
| R7 | −0.325 | −0.090 | −0.243 | −0.192 | −0.053 |
| R8 | 1.082 | −0.927 | 2.277 | 0.689 | −0.590 |
| R9 | −3.705 | 1.835 | −2.908 | −1.090 | 0.540 |
| R10 | −20.287 | 0.821 | −0.373 | −0.306 | 0.012 |
| R11 | 26.997 | −2.185 | 1.546 | 1.193 | −0.097 |
| R12 | −38.086 | −2.086 | −2.139 | −1.910 | −0.105 |
| R13 | 4.525 | −0.951 | 1.475 | 1.075 | −0.226 |
| RΣ | 1.706 | −0.021 | 0.085 | 0.029 | −0.019 |

Example I
$f = 100 \quad F/4.5 \quad 100°$

| R1= | 896.667 | $d_1 =$ | 2.11 | $n_1 = 1.51118$ | $\nu d_1 =$ | 50.9 |
| R2= | 109.0 | $d_2 =$ | 0.11 | | | |
| R3= | 42.889 | | | | | |
| R4= | 27.549 | $d_3 =$ | 1.67 | $n_2 = 1.61266$ | $\nu d_2 =$ | 44.3 |
| | | $d_4 =$ | 23.67 | | | |
| R5= | 34.1 | | | | | |
| | | $d_5 =$ | 16.39 | $n_3 = 1.79877$ | $\nu d_3 =$ | 44.27 |
| R6= | −44.444 | | | | | |
| | | $d_6 =$ | 2.67 | $n_4 = 1.67163$ | $\nu d_4 =$ | 38.8 |
| R7= | 36.167 | | | | | |
| | | $d_7 =$ | 4.0 | $n_5 = 1.51823$ | $\nu d_5 =$ | 59.0 |
| R8= | 323.889 | | | | | |
| | | $d_8 =$ | 3.89 | | | |
| R9= | −181.111 | | | | | |
| | | $d_9 =$ | 9.67 | $n_6 = 1.48749$ | $\nu d_6 =$ | 70.0 |
| R10= | −17.811 | | | | | |
| | | $d_{10} =$ | 13.06 | $n_7 = 1.60342$ | $\nu d_7 =$ | 38.0 |
| R11= | −37.044 | | | | | |
| | | $d_{11} =$ | 7.67 | | | |
| R12= | −20.944 | | | | | |
| | | $d_{12} =$ | 1.67 | $n_8 = 1.60311$ | $\nu d_8 =$ | 60.7 |
| R13= | −42.976 | | | | | |

Bf = 68.44; Σd = 86.58

Example II
$f = 100 \quad F/4.5 \quad 100°$

| R1= | 1248.0 | $d_1 =$ | 2.67 | $n_1 = 1.54072$ | $\nu d_1 =$ | 47.2 |
| R2= | 128.667 | $d_2 =$ | 0.88 | | | |
| R3= | 46.533 | | | | | |
| | | $d_3 =$ | 2.0 | $n_2 = 1.61266$ | $\nu d_2 =$ | 44.3 |
| R4= | 28.853 | | | | | |
| | | $d_4 =$ | 24.8 | | | |
| R5= | 35.067 | $d_5 =$ | 18.67 | $n_3 = 1.79877$ | $\nu d_3 =$ | 44.27 |
| R6= | −45.528 | $d_6 =$ | 1.4 | $n_4 = 1.67163$ | $\nu d_4 =$ | 38.8 |
| R7= | 39.6 | | | | | |
| | | $d_7 =$ | 4.4 | $n_5 = 1.51823$ | $\nu d_5 =$ | 59.0 |
| R8= | 419.6 | | | | | |
| | | $d_8 =$ | 4.67 | | | |
| R9= | −186.67 | | | | | |
| | | $d_9 =$ | 8.0 | $n_6 = 1.48749$ | $\nu d_6 =$ | 70.0 |
| R10= | −18.133 | | | | | |
| | | $d_{10} =$ | 14.13 | $n_7 = 1.60342$ | $\nu d_7 =$ | 38.0 |
| R11= | −40.533 | | | | | |
| | | $d_{11} =$ | 8.67 | | | |
| R12= | −21.387 | | | | | |
| | | $d_{12} =$ | 2.13 | $N_8 = 1.60311$ | $\nu d_8 =$ | 60.7 |
| R13= | −42.363 | | | | | |

Bf = 66.49; Σd = 92.47

Example III
$f = 100 \quad F/4 \quad 100°$

| R1= | ∞ | | | | | |
| R2= | 144.15 | $d_1 =$ | 3.08 | $n_1 = 1.51118$ | $\nu d_1 =$ | 50.9 |
| | | $d_2 =$ | 4.15 | | | |
| R3= | 46.154 | | | | | |
| | | $d_3 =$ | 2.31 | $n_2 = 1.61266$ | $\nu d_2 =$ | 44.3 |
| R4= | 28.769 | | | | | |
| | | $d_4 =$ | 22.15 | | | |
| R5= | 35.138 | | | | | |
| | | $d_5 =$ | 19.69 | $n_3 = 1.79877$ | $\nu d_3 =$ | 44.27 |
| R6= | −46.031 | | | | | |
| | | $d_6 =$ | 1.23 | $n_4 = 1.67163$ | $\nu d_4 =$ | 38.8 |
| R7= | 42.0 | | | | | |
| | | $d_7 =$ | 3.85 | $n_5 = 1.52$ | $\nu d_5 =$ | 70.1 |
| R8= | 386.15 | | | | | |
| | | $d_8 =$ | 5.08 | | | |
| R9= | −186.15 | | | | | |
| | | $d_9 =$ | 8.31 | $n_6 = 1.51835$ | $\nu d_6 =$ | 60.3 |
| R10= | −18.4 | | | | | |
| | | $d_{10} =$ | 14.62 | $n_7 = 1.61293$ | $\nu d_7 =$ | 36.9 |
| R11= | −42.538 | | | | | |
| | | $d_{11} =$ | 7.69 | | | |
| R12= | −21.554 | | | | | |
| | | $d_{12} =$ | 3.38 | $n_8 = 1.62299$ | $\nu d_8 =$ | 58.1 |
| R13= | −42.738 | | | | | |

-continued

Bf = 64.65; Σd = 95.54

We claim:
1. A wide angle lens system comprising, in succession from the object side toward the image side:
   a divergent first lens group having its surface of smaller curvature facing the object side;
   a divergent, meniscus, second lens group having its convex surface facing the object side;
   said first and second lens groups defining therebetween a divergent meniscus-shaped air chamber having its convex surface facing the object side;
   a convergent, meniscus, third lens group consisting of a plurality of lenses;
   a convergent, meniscus, fourth lens group consisting of a plurality of lenses; and
   a divergent, meniscus, fifth lens group having its convex surface facing the image side.

2. A wide angle lens system according to claim 1, wherein said third lens group is a cemented lens consisting of three elements.

3. A wide angle lens system according to claim 2, wherein the following conditions are satisified:

$$d_{11} < d_4, \quad (1)$$
$$R2 > R3 \text{ and} \quad (2)$$
$$n_3 > n_4, \quad (3)$$

where $d_{11}$ is the air-spacing between said fourth and said fifth lens group, $d_4$ is the air spacing between said second and said third lens group, R2 is the radius of curvature of the lens surface of said first lens group which is adjacent to said divergent meniscus-shaped air chamber, R3 is the radius of curvature of the lens surface of said second lens group which is adjacent to said divergent meniscus-shaped air chamber, and $n_3$ and $n_4$ each are the refractive indices of the first and second lenses in said third lens group as viewed from the object side.

4. A wide angle lens system according to claim 1, wherein said fourth lens group is a cemented lens consisting of two elements.

5. A wide angle lens system according to claim 3, wherein the following condition is further satisfied:

$$d_{11} < 0.5 d_4$$

6. A wide angle lens system according to claim 3, wherein the following condition is further satisfied:

$$2R4 > R3 > R4,$$

where R4 represents the radius of curvature of the lens surface of said second lens group which is adjacent to said third lens group.

7. A wide angle lens system according to claim 3, wherein said fourth lens group is a cemented lens consisting of two elements and the following conditions are further satisfied:

$$\nu d_3 > \nu d_4 < \nu d_5 \text{ and} \quad (1)$$
$$\nu d_6 > \nu d_7. \quad (2)$$

where $\nu d_3$, $\nu d_4$ and $\nu d_5$ each represent the dispersive power of the first, second and third lenses in said third lens group as viewed from the object side, and $\nu d_6$ and $\nu d_7$ represent the dispersive power of the first and second lenses in said fourth lens group as viewed from the object side.

8. A wide angle lens system according to claim 3, wherein data are as follows:

| f = 100; B.f.=68.44; F/4.5; angle of view 100° | | | | |
|---|---|---|---|---|
| R1= +896.667 | $d_1$ = 2.11 | $n_1$ = 1.51118 | $\nu d_1$ = | 50.9 |
| R2= +109.0 | $d_2$ = 0.11 | | | - |
| R3= +42.889 | $d_3$ = 1.67 | $n_2$ = 1.61266 | $\nu d_2$ = | 44.3 |
| R4= +27.549 | $d_4$ = 23.67 | | | |
| R5= +34.1 | $d_5$ = 16.39 | $n_3$ = 1.79877 | $\nu d_3$ = | 44.27 |
| R6= −44.444 | $d_6$ = 2.67 | $n_4$ = 1.67163 | $\nu d_4$ = | 38.8 |
| R7= +36.167 | $d_7$ = 4.0 | $n_5$ = 1.51823 | $\nu d_5$ = | 59.0 |
| R8= +323.889 | $d_8$ = 3.89 | | | |
| R9= −R9= | | | | |
| R10= −17.811 | $d_9$ = 9.67 | $n_6$ = 1.48749 | $\nu d_6$ = | 70.0 |
| | $d_{10}$ = 13.06 | $n_7$ = 1.60342 | $\nu d_7$ = 38.0 | |
| R11= −37.044 | $d_{11}$ = 7.67 | | | |
| R12= −20.944 | $d_{12}$ = 1.67 | $n_8$ = 1.60311 | $\nu d_8$ = | 60.7 |
| R13= −42.976 | | | | |

9. A wide angle lens system according to claim 3, wherein data are as follows:

| f = 100; B.f. = 66.49; F/4.5; angle of View 100° | | | | |
|---|---|---|---|---|
| R1= =1248.0 | $d_1$ = 2.67 | $n_1$ = 1.54072 | $\nu d_1$ = | 47.2 |
| R2= +128.677 | $d_2$ = 0.93 | | | |
| R3= +46.533 | $d_3$ = 2.0 | $n_2$ = 1.61266 | $\nu d_2$ = | 44.3 |
| R4= +28.853 | $d_4$ = 24.8 | | | |
| R5= +35.067 | $d_5$ = 18.67 | $n_3$ = 1.79877 | $\nu d_3$ = | 44.27 |
| R6= −45.528 | $d_6$ = 1.4 | $n_4$ = 1.67163 | $\nu d_4$ = | 38.8 |
| R7= +39.6 | $d_7$ = 4.4 | $n_5$ = 1.51823 | $\nu d_5$ = | 59.0 |
| R8= +419.6 | $d_8$ = 4.67 | | | |
| R9=−186.67 | | | | |
| R10= −18.133 | $d_9$ = 8.0 | $n_6$ = 1.48749 | $\nu d_6$ = | 70.0 |
| R11= −40.533 | $d_{10}$ = 14.13 | $n_7$ = 1.60342 | $\nu d_7$ = | 38.0 |
| R12= −21.387 | $d_{11}$ = 8.67 | | | |
| R13= −42.363 | $d_{12}$ = 2.13 | $n_8$ = 1.60311 | $\nu d_8$ = | 60.7 |

10. A wide angle lens system according to claim 3, wherein data are as follows:

| f = 100; B.f. = 64.65; F/4; Angle of view 100° | | | | |
|---|---|---|---|---|
| R1= ∞ | $d_1$ = 3.08 | $n_1$ = 1.51118 | $\nu d_1$ = | 50.9 |
| R2= +144.15 | $d_2$ = 4.15 | | | |
| R3= +46.154 | $d_3$ = 2.31 | $n_2$ = 1.61266 | $\nu d_2$ = | 44.3 |
| R4= +28.769 | $d_4$ = 22.15 | | | |
| R5= +35.138 | $d_5$ = 19.69 | $n_3$ = 1.79877 | $\nu d_3$ = | 44.27 |
| R6= −46.031 | $d_6$ = 1.23 | $n_4$ = 1.67163 | $\nu d_4$ = | 38.8 |
| R7= +42.0 | $d_7$ = 3.85 | $n_5$ = 1.52 | $\nu d_5$ = | 70.1 |
| R8= +386.15 | $d_8$ = 5.08 | | | |
| R9= −186.15 | | | | |
| R10= −18.4 | $d_9$ = 8.31 | $n_6$ = 1.51835 | $\nu d_6$ = | 60.3 |
| R11= −42.538 | $d_{10}$ = 14.62 | $n_7$ = 1.61293 | $\nu d_7$ = | 36.9 |
| R12= −21.554 | $d_{11}$ = 7.69 | | | |
| R13= −42.738 | $d_{12}$ = 3.38 | $n_8$ = 1.62299 | $\nu d_8$ = | 58.1 |

* * * * *